United States Patent [19]

Tochitani et al.

[11] 4,011,556

[45] Mar. 8, 1977

[54] GRAPHIC DISPLAY DEVICE

[75] Inventors: Yutaka Tochitani; Takashi Shinbata; Yoshitsugu Morioka, all of Musashino, Japan

[73] Assignee: Yokogawa Electric Works, Ltd., Tokyo, Japan

[22] Filed: May 28, 1975

[21] Appl. No.: 579,785

[52] U.S. Cl. .................... 340/324 AD; 340/172.5; 340/324 A

[51] Int. Cl.[2] .................... G06K 15/20; G06F 3/14

[58] Field of Search ................. 340/324 A, 324 AD

[56] References Cited

UNITED STATES PATENTS

| | | | |
|---|---|---|---|
| 3,400,377 | 9/1968 | Lee | 340/324 AD |
| 3,848,232 | 11/1974 | Leibler et al. | 340/324 AD |

*Primary Examiner*—David L. Trafton
*Attorney, Agent, or Firm*—Parmelee, Johnson & Bollinger

[57] ABSTRACT

A graphic display device of the type which receives data and instructions from an external computer and displays graphic patterns such as alphanumeric characters, symbols, etc., upon a cathode ray tube in accordance therewith. The graphic display device has a pattern generator for storing luminance data controlling the formation on the cathode ray tube of predetermined patterns, and a refresh memory for receiving and storing data designating the particular arrangement of patterns to be displayed, and is characterized by an arrangement reducing the required capacity of the pattern generator memory. Pursuant to the invention, the pattern generator is formed with a random access memory into which data can be written and from which data can be read, and has means operated on a time sharing multiplexing basis with data reading operations for writing luminance data supplied by the external computer into the pattern generator memory, and for storing in the refresh memory the addresses of the luminance data written into the pattern generator memory. The pattern generator need store formation data for only those characters actually being displayed on the cathode ray tube, and memory requirements are minimized.

9 Claims, 3 Drawing Figures

GRAPHIC DISPLAY DEVICE

BACKGROUND OF THE INVENTION

1. Field of the Invention

This invention relates to graphic display devices used as terminal devices for data processing systems wherein a central computer supplies data to be graphically displayed, e.g., upon a cathode ray tube.

2. Description of the Prior Art

Graphic display devices using a cathode ray tube (CRT) with a raster scan system for developing characters have been in use for a number of years with general purpose digital computers. Such devices have an alphanumeric character generator which stores data regarding the formation of the vocabulary of characters to be drawn upon for display, and a refresh memory which stores data designating the particular arrangement of characters to be displayed on the CRT. Typically, the character generator employs a read-only-memory (ROM), and the number of characters, numerals or symbols available for display on the CRT is limited by the memory capacity. Increasing memory capacity to allow storage of more alphanumeric data is expensive. For various reasons a satisfactory solution to this problem has not been found.

SUMMARY OF THE INVENTION

It is a principal object of this invention to provide an improved graphic display device for receiving data and instructions from an external computer and for displaying graphic patterns in accordance therewith. It is a specific object of the invention to provide a graphic display device which is not limited in the number of characters, numerals or symbols which can be displayed, but nevertheless can be manufactured at low cost. Still another object of the invention is to provide a graphic display device more suitable for commercial use.

In a preferred embodiment of the invention to be described hereinbelow in detail, the graphic display device is of the kind having a pattern generator for storing luminance data to control the formation on the cathode ray tube of predetermined patterns, and a refresh memory for receiving and storing data designating the particular arrangement of patterns to be displayed. In accordance with the invention, the pattern generator is formed with a random access memory into which data can be written and from which data can be read, and the device includes means for writing luminance data supplied by the external computer into the pattern generator memory, the refresh memory storing the addresses of the luminance data which has been written into the pattern generator memory. This arrangement requires that the pattern generator memory store formation data for only those characters actually being displayed on the cathode ray tube, and the pattern generator memory can function with only a small storage capacity. In a further aspect of the invention, the means for writing luminance data into the pattern generator memory is operated on a time sharing multiplexing arrangement with means for reading data stored in the pattern generator memory, so that data can be rewritten into the pattern generator memory while display is taking place.

Other objects, aspects and advantages of the invention will be pointed out in, or apparent from, the detailed description hereinbelow, considered together with the following drawings.

DESCRIPTION OF THE PREFERRED EMBODIMENT

Figure 1A:
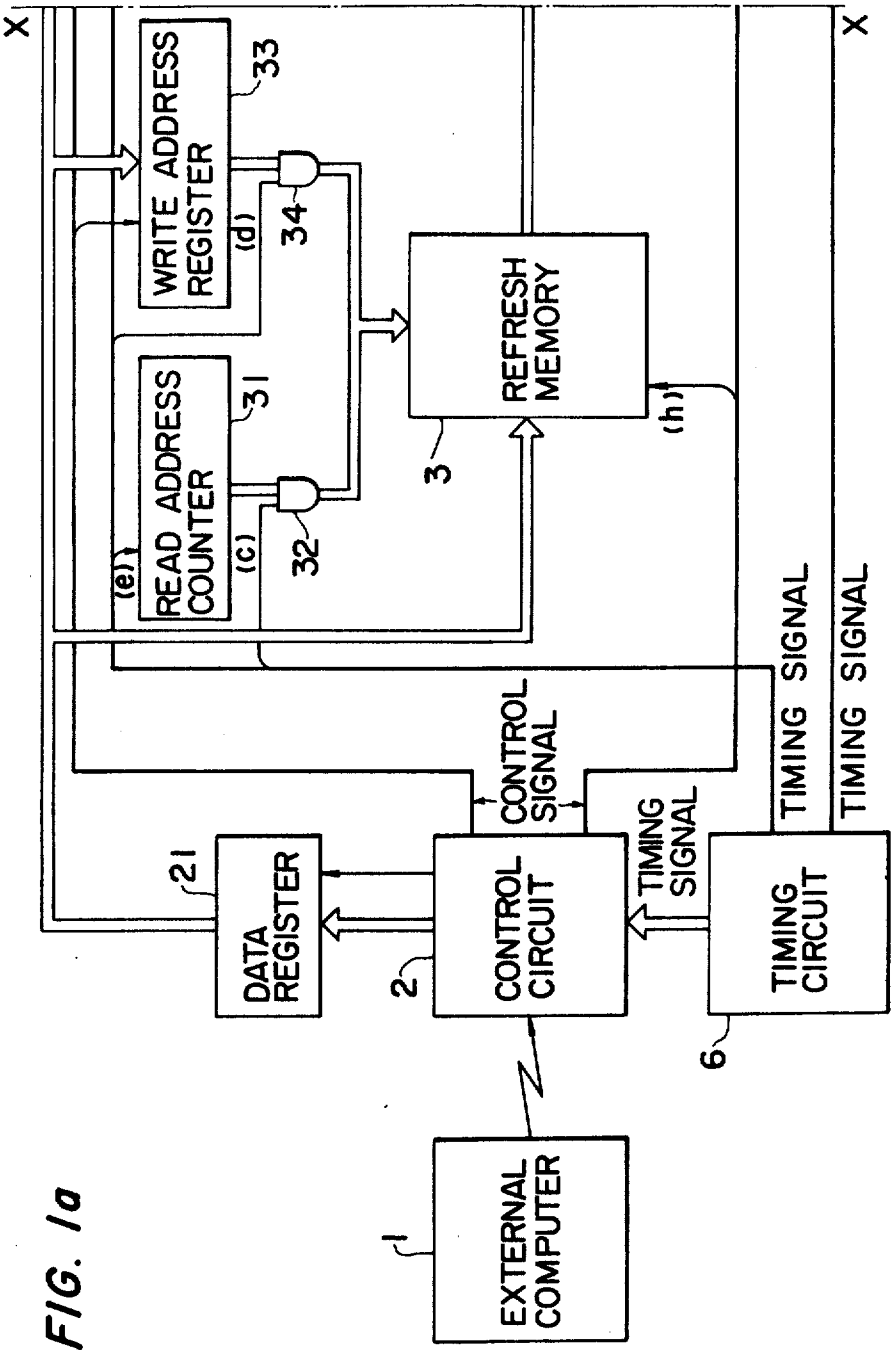
FIGS. 1*a* and 1*b* are portions of a schematic diagram to be joined on line *x*—*x*, showing the construction of a graphic display device in accordance with the invention.
Figure 1B:
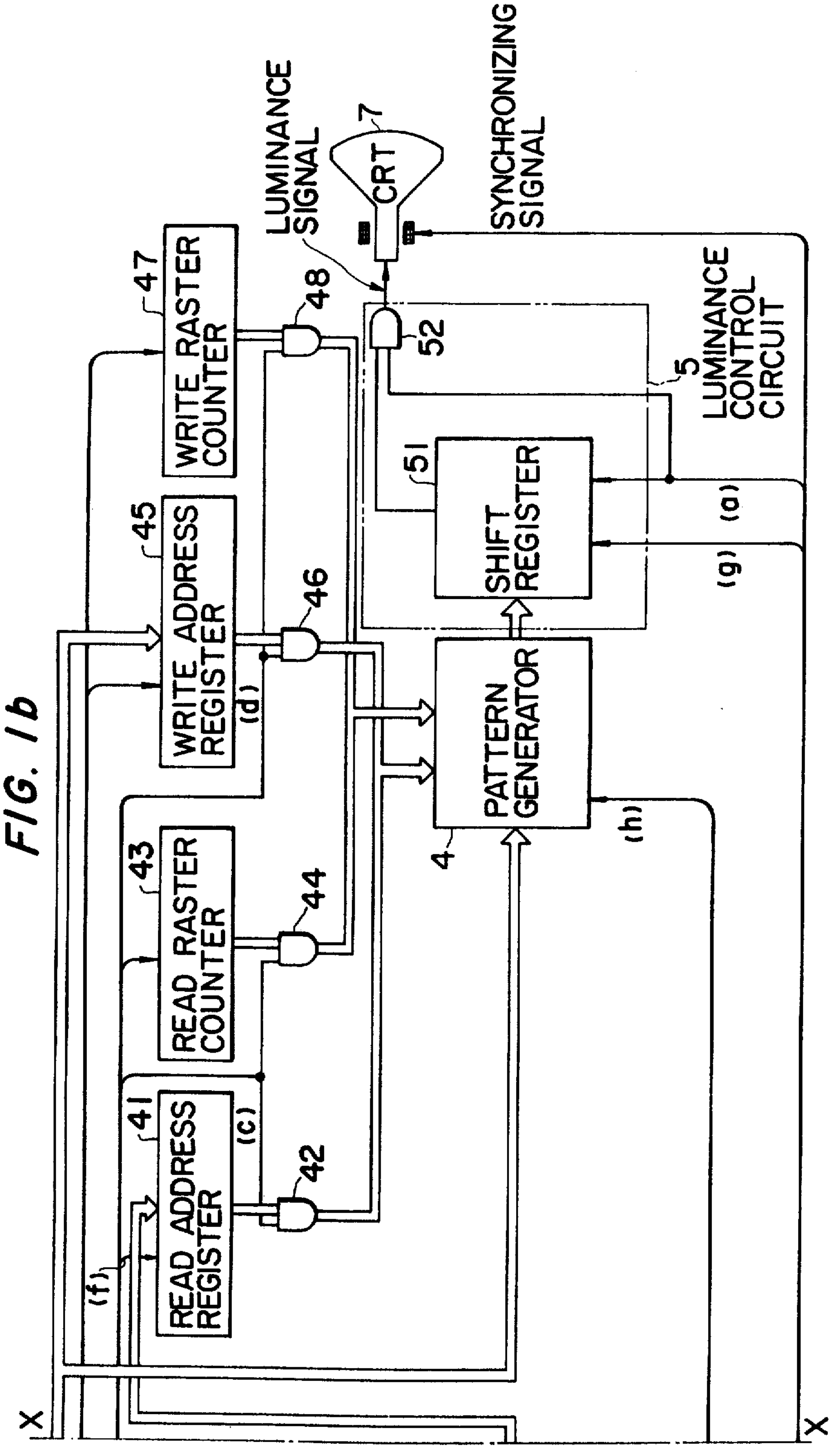

FIGS. 1*a* and 1*b* illustrate schematically the construction of a graphic display device in accordance with the present invention. The display device, supplied with data and instructions from an external general purpose digital computer 1, comprises a control circuit 2, a refresh memory 3, a pattern generator 4, a luminance control circuit 5, a timing circuit 6, and a cathode-ray tube (CRT) 7.

The control circuit 2 receives data and instructions from the external computer 1 and controls the operation of the display device. Through this control circuit, the refresh memory 3 receives and stores data designating the particular characters, numerals, or symbols to be displayed. The pattern generator 4 receives data from the refresh memory 3 and converts it into a pattern signal, i.e., a luminance signal for causing alphanumeric data to be displayed on the screen of CRT 7 in the form of a matrix of visible dots. As will be described in greater detail below, the pattern generator 4 comprises a random access memory (RAM) for memorizing luminance signals regarding predetermined characters, numerals, symbols, etc., and the data stored in the RAM can be rewritten by a control signal supplied from the computer 1 through the control circuit 2. The output of the pattern generator 4 is sent to the luminance control circuit 5, which in turn controls the luminance of graphic data on the CRT screen. The timing circuit 6 generates timing signals *a* through *g* for the individual circuits of the display device, as will be explained below in connection with the timing diagram of FIG. 2. The control circuit 2 supplies write data through a data register 21 to the refresh memory 3 and to the pattern generator 4. The control circuit 2 also supplies a write address to a write address register 33 of the refresh memory 3 and to a write address register 45 of the pattern generator 4. Control signals from the control circuit 2 designate which of the refresh memory 3, the pattern generator 4, the write address register 33, or the write address register 45 is to receive data from the data register 21.

Data writing in the refresh memory 3 is carried out in the following manner. An address is registered in the write address register 33 from the data register 21, write data are set in the data register 21, and a write timing signal *d* and a write control signal *h* are supplied respectively to an AND gate 34 and to the refresh memory 3 whereby data are written in the refresh memory.

Data writing in the pattern generator 4 is accomplished in the following manner. An address is set in the write address register 45 from the data register 21, a data signal (i.e., luminance signal) corresponding to one raster of the pattern to be written is set in the data register 21, and a write timing signal *d* and a write control signal *h* are supplied respectively to AND gates 46 and 48 and to the pattern generator 4. After writing of luminance data for one raster, a raster counter 47 has its count advanced by one by a control signal. Then the data corresponding to the next raster of the same pattern is set in the data register 21. Writing of this data is carried out by another timing signal and control signal in the same manner as described above. A complete pattern is written by repeating a series of the above operations. After writing of a complete pattern, the data in the write address register 45 is renewed and then another pattern is written in another location of the memory.

Data reading from the refresh memory 3 is done in the following manner. The data in a read address counter 31 is supplied to the refresh memory 3 through AND gate 32 opened by a read timing signal. The read address counter 31 has its count advanced by one each time one word of data is read out of the refresh memory 3, and thus the next address is designated. In this manner, data are read in sequence from the refresh memory 3. The data so read are addresses designating particular patterns stored in the pattern generator 4 and each address in turn is set in the read address register 41 by a timing signal. The data in the read address register 41 is supplied to the pattern generator 4 through an AND gate 42 opened by a read timing signal. At the same time, the data in a read raster counter 43 is supplied to the pattern generator 4 through an AND gate 44.

The output of the pattern generator 4 is set in a shift register 51 by a timing signal. The data in the shift register 51 thus is a luminance signal corresponding to one raster of the pattern. The luminance signals are serially sent out through an AND gate 52 to the luminance circuit of CRT 7 by a clock pulse. Concurrently the CRT 7 is supplied with horizontal and vertical synchronizing signals from the timing circuit and thus a raster scan is performed on the CRT screen. The read raster counter 43 has its count advanced by one each time one raster scan is completed, and a complete pattern is obtained by a series of the foregoing operations.

Figure 2:
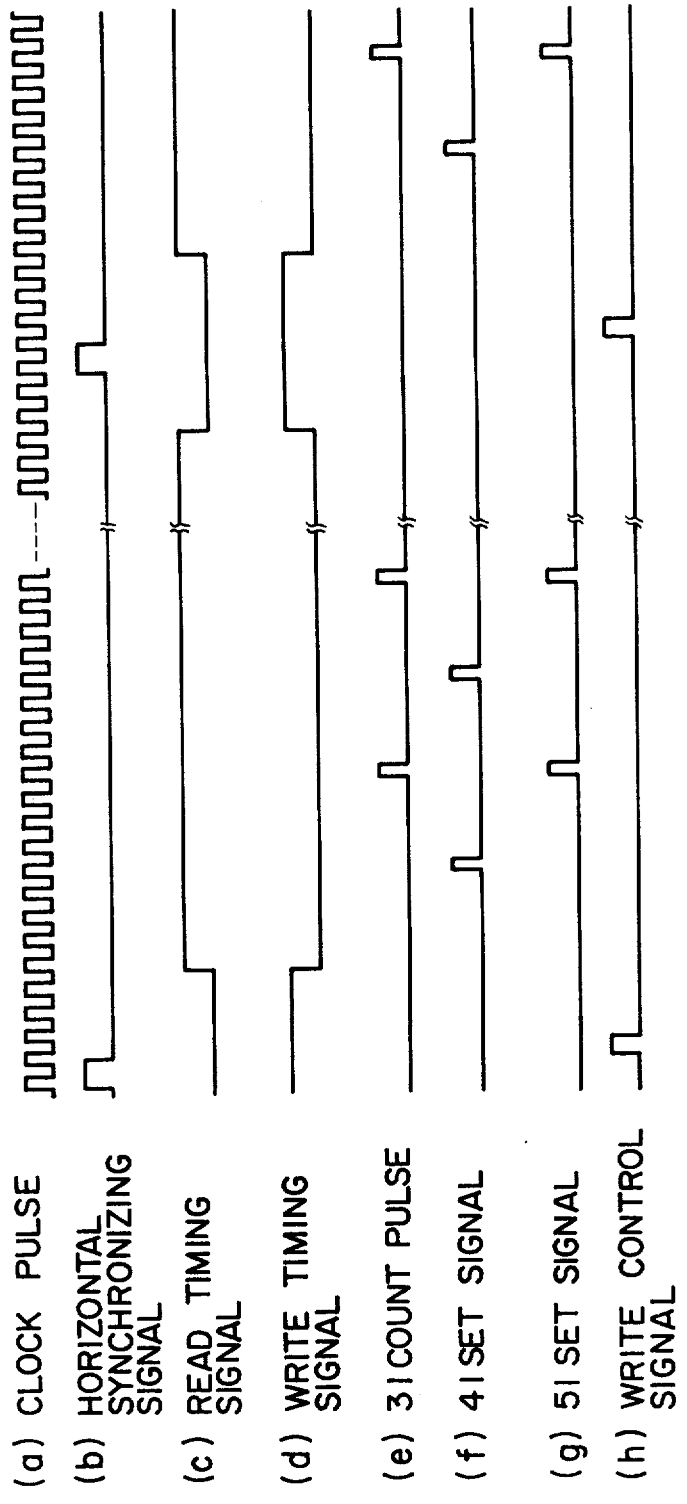
FIG 2 is a timing diagram illustrating the operation of the device shown in FIGS. 1*a* and 1*b*.

FIG. 2 is a timing diagram illustrating the operation, per raster, of the device described above. In FIG. 2, *a* is a clock pulse which determines the minimum resolution of a dot in the horizontal direction, *b* is a horizontal synchronizing signal, *c* is a read timing signal supplied to AND gates 32, 42 and 44, *d* is a write timing signal supplied to AND gates 34, 46 and 48, *e* is a count pulse supplied to the read address counter 31 of refresh memory 3, *f* is a set signal supplied to the read address register 41 of pattern generator 4, *g* is a set signal supplied to the shift register 51, and *h* is a write control signal supplied to the refresh memory 3 or pattern generator 4 when a write instruction is included in the command signal from the external computer 1.

The timing of data reading from the refresh memory 3 and pattern generator 4 and display on the CRT is as follows. At the instant the read timing signal *c* starts, the read address counter 31 holds the address where the head of a pattern in a row of the matrix of patterns is located. This address is given to the refresh memory 3 through the AND gate 32 which is opened. The data at this address is read from the refresh memory 3 and supplied to the read address register 41 of pattern generator 4. This address signal is set by the set signal *f* and sent to the pattern generator 4 through the AND gate 42 which is opened. At the same time, the pattern generator receives data from the read raster counter 43 and generates a signal in accordance with the data at the address given, i.e., a luminance signal output corresponding to one raster of the pattern. This luminance signal is supplied to the shift register 51 and set therein by the set signal *g*. Then the luminance signal is supplied serially, as bits corresponding to one raster, to the CRT 7 and the head of a pattern in a row of matrix is displayed. At the same timing at which the data is set in the shift register 51, the data in the read address counter 31 is counted up by the count pulse *e* and thus the address at the second display position of the row is designated. By this operation, the data in the next address is read from the refresh memory 3 and supplied to the read address register 41 of pattern generator 4. In the manner described above, one raster of the next pattern is displayed on the CRT screen. By horizontal sweep, through repetition of the above operations, one raster of all of the patterns in one row, is displayed on the CRT 7. By repeating this horizontal sweep, patterns in a column are drawn raster by raster.

The timing of data rewriting in the pattern generator 4 is as follows. Assume that an instruction for rewriting the data in the pattern generator 4 is generated by the external computer 1 during operation of a display on the CRT 7. Then the address included in the instruction is set by the control circuit 2 into the write address register 45 of pattern generator 4 through the data register 21. The luminance signal corresponding to the first raster of the pattern to be written is set in the data register 21 by the control circuit 2. This data is then supplied to the pattern generator 4. The data in the write address counter 44 and also the data in the write raster counter 47 are supplied through AND gates 46 and 48 to the pattern generator 4 during the period of write signal (*d*), and the data (i.e., the luminance signal) in the data register 21 is set in the pattern generator 4 by the write control signal *h*. As a result, the luminance signal corresponding to one raster of the pattern is written in the given address of the pattern generator 4. Then the data in the write raster counter 47 is counted up by one whereby the next address is designated. The luminance signal corresponding to the next raster of the same pattern is set in the data register 21. This luminance signal is written in the pattern generator 4 at the instant the next write period comes, i.e., following the read period. By repeating these operations, the luminance signal of the given pattern is rewritten raster by raster. The data in the refresh memory is rewritten in the same manner.

According to the present invention, a random access memory (RAM) is utilized for storing pattern data. This memory is able to store a variety of pattern data or alphanumeric data in a time-sharing multiplexing system, with the result that the characters, numerals or symbols to be displayed are not limited by memory capacity as in the prior art techniques. A RAM of small memory capacity suffices for the purpose of the invention, which permits inexpensive graphic display devices to be manufactured.

One preferred embodiment of a graphic display device with a CRT raster-scan system has been described above. It is evident that the invention is readily applicable to any display device of the type in which a pattern signal held in the memory is supplied to a display unit according to an instruction from a data processing system.

Although a specific embodiment of the invention has been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

We claim:

1. A graphic display device of the type receiving data and instructions from an external computer and displaying patterns such as alphanumeric characters, symbols, etc. upon a cathode ray tube in accordance therewith, the graphic display device having a pattern generator for storing luminance data to control the formation on the cathode ray tube of predetermined patterns, and a refresh memory for receiving and storing data designating the particular arrangement of patterns to be displayed, the display device being characterized by a pattern generator formed with a random access memory into which data can be written and from which data can be read;

means for writing luminance data supplied by the external computer into the pattern generator memory;

the refresh memory storing the addresses of the luminance data written into the pattern generator memory; and means for thereafter reading the luminance data from the pattern generator memory as designated by the refresh memory to form an arrangement of graphic patterns upon the cathode ray tube;

whereby the pattern generating memory need store formation data only for those characters actually being displayed on the cathode ray tube, and the memory thereby requires only a small storage capacity.

2. A graphic display device as claimed in claim 1 wherein the means for writing luminance data into the pattern generator memory comprises a data register for storing the data to be written, a write address register for storing the address of the data to be written, and timing means for transferring the data from the data register to the pattern generator memory at the address designated in the write address register.

3. A graphic display device as claimed in claim 2 wherein the means for writing luminance data into the pattern generator memory further comprises a write raster counter for designating sequential addresses for storage of data written into the memory in the form of separate raster together forming a pattern.

4. A graphic display device as claimed in claim 2 wherein the timing means is arranged to transfer data from the data register to the pattern generator memory on a time sharing basis with means for reading data from the pattern generator memory.

5. A graphic display device as claimed in claim 1 further comprising timing means arranged to operate the luminance data writing means and luminance data reading means on a time sharing multiplexing basis.

6. A graphic display device as claimed in claim 5 wherein the graphic patterns are generated by a series of rasters of data, and the timing means is arranged to write a raster of luminance data into the memory between successive readings of stored rasters of data.

7. A method for operating a graphic display device of the type receiving data and instructions from an external computer and displaying graphic patterns such as alphanumeric characters, symbols, etc. upon a cathode ray tube in accordance therewith, the graphic display device having a pattern generator formed with a random access read/write memory for storing luminance data to control the formation of predetermined patterns, and a refresh memory for receiving and storing data designating the particular arrangement of patterns to be displayed, the method of operation being characterized by generating the luminance data formation of characters in the external computer, writing the luminance data into the pattern generator memory, storing in the refresh memory the addresses of the luminance data written into the pattern generator memory, and thereafter reading the luminance data from the pattern generator memory as designated by the refresh memory to form an arrangement of graphic patterns upon the cathode ray tube, whereby the pattern generator memory needs to store formation data for only those characters actually being displayed on the cathode ray tube, and the memory thereby requires only a small storage capacity.

8. A method for operating a graphic display device as claimed in claim 7 wherein the writing of data into the pattern generator memory is accomplished on a time sharing multiplexing basis with the reading of data from the pattern generator memory.

9. A method for operating a graphic display device as claimed in claim 8 wherein the writing and reading time sharing is on the basis of units of time for single rasters of data.

* * * * *